(12) United States Patent
Kurian et al.

(10) Patent No.: US 7,086,416 B2
(45) Date of Patent: Aug. 8, 2006

(54) VALVE ASSEMBLY HAVING A COMPENSATING GATE

(75) Inventors: Joe Kurian, Sugar Land, TX (US); Freddie Gines, Humble, TX (US); Michael Lemeshev, Bellaire, TX (US); Paul Watts, Cypress, TX (US)

(73) Assignee: Zimmerman & Jansen, Inc., Humble, TX (US)

( * ) Notice: Subject to any disclaimer, the term of this patent is extended or adjusted under 35 U.S.C. 154(b) by 65 days.

(21) Appl. No.: 10/855,768

(22) Filed: May 27, 2004

(65) Prior Publication Data

US 2005/0263732 A1    Dec. 1, 2005

(51) Int. Cl.
  *F16K 11/052*    (2006.01)
  *F16K 1/16*    (2006.01)
(52) U.S. Cl. .................................. 137/625.44; 137/875
(58) Field of Classification Search ................ 251/298, 251/301, 302, 86; 137/625.44, 625.45, 867, 137/872, 875
See application file for complete search history.

(56) References Cited

U.S. PATENT DOCUMENTS

| 2,035,747 | A | * | 3/1936 | Harris | 137/625.44 |
| 3,554,487 | A | * | 1/1971 | Vesco | 251/298 |
| 3,658,293 | A | * | 4/1972 | Gaebel | 251/228 |
| 3,831,622 | A | * | 8/1974 | Grewer et al. | 137/340 |
| 4,381,795 | A | * | 5/1983 | Power et al. | 137/240 |
| 4,718,457 | A | * | 1/1988 | Luger | 137/875 |
| 4,919,169 | A | * | 4/1990 | Bachmann et al. | 137/875 |
| 5,116,022 | A |   | 5/1992 | Genreith et al. | |
| 5,186,205 | A | * | 2/1993 | Bachmann | 137/242 |
| 5,322,087 | A | * | 6/1994 | Koudijs | 137/875 |
| 5,697,596 | A | * | 12/1997 | Kremers et al. | 251/58 |
| 5,908,047 | A | * | 6/1999 | Nakamura et al. | 137/875 |
| 6,647,708 | B1 | * | 11/2003 | Bornhoft et al. | 60/226.1 |

FOREIGN PATENT DOCUMENTS

JP        07224633 A  *  8/1995

* cited by examiner

Primary Examiner—Justine R. Yu
Assistant Examiner—Andrew J. Rost
(74) Attorney, Agent, or Firm—Patterson & Sheridan, L.L.P.

(57) ABSTRACT

Methods and apparatus for selectively blocking or redirecting flow with a valve that compensates for misalignment between a seat and a gate are disclosed. In one aspect, a valve includes a gate having two discs spaced from one another, first and second seats within first and second passageways of the valve, respectively, and at least one lever arm coupled to an actuator for rotating the gate, thereby diverting flow. The lever arm is disposed between the discs and pivotally couples to the gate such that the pivoting movement of the gate enables compensation for the misalignment. A method includes rotating a gate from a first position with a plane of the gate axially aligned with flow to a second position with the disc initially contacting a seat and compensating for the misalignment by pivoting the gate with respect to the lever arm such that the gate squarely contacts the seat.

13 Claims, 6 Drawing Sheets

VALVE ASSEMBLY HAVING A COMPENSATING GATE

BACKGROUND OF THE INVENTION

1. Field of the Invention

Embodiments of the present invention generally relate to a valve assembly for selectively blocking or redirecting flow. More particularly, embodiments of the invention relate to a valve assembly having a gate that compensates for misalignment with a seat of the valve assembly.

2. Description of the Related Art

Industrial valves have many uses for selectively blocking or redirecting a flow of fluids such as gases and liquids, solids and mixtures thereof. Examples of industries that commonly utilize valves include water utilities, power plants, refineries and chemical manufacturing. Open/close type valves may be used to selectively block flow through a conduit. On the other hand, diverter type valves effectively block flow through one passageway of the valve and open flow through a diverted passageway of the valve depending upon the position of the valve. These diverter valves have particular utility in permitting isolation of one line due to, for example, an emergency condition such as a line rupture or construction on a portion of the line that is blocked by the valve while permitting flow though another line such as a bypass.

One type of valve which may be referred to as a "flapper valve" utilizes a gate or disc that pivots about one end thereof in order to permit a face of the disc to make positive contact to a valve seat within the valve. In the open position, the disc is rotated (e.g., 90°) such that the plane of the disc is substantially axially aligned with a flow of fluid through the valve and does not substantially interfere with the fluid flow. Rotation of the disc toward the valve seat closes the valve to fluid flow once the disc makes contact with the valve seat. Contact between the disc and the valve seat may form a seal to completely prevent fluid flow through the valve.

A variation of the flapper valve may be configured as a diverter valve which may be referred to as a "flip-flop diverter valve." A disc of the flip-flop diverter valve can rotate between a first position and a second position. The disc contacts a first seat along a first fluid passageway of the valve when in the first position and contacts a second seat along a second fluid passageway when in the second position. Thus, the flip-flop diverter valve operates similar to the flapper valve to selectively block fluid flow through the first passageway of the valve and thereby open fluid flow through the second fluid passageway.

Proper sealing between the disc and the valve seat requires that the disc be properly aligned with respect to the valve seat such that the entire perimeter of the disc tightly contacts the valve seat when closed. Even if manufactured with a correct initial alignment, the alignment between the valve seat and the disc can change due to possible movements of the valve seat, thereby causing a loose contact between the disc and the valve seat that may prevent proper sealing. For example, temperature changes of the valve can cause expansion or contraction of the valve or valve seat itself, which may cause the surface of the valve seat that the disc contacts to move relative to the disc fixed within the valve. In the case where the valve seat includes a cone within the valve, the cone grows as the temperature rises such that the valve seat and disc may not be properly aligned due to the reduced spacing therebetween. Manufacturing a predetermined alignment between the disc and the valve seat in order to compensate for the movements still only accommodates the valve seat at one particular location and fails to account for applications of the valve having various temperatures and for the inability to determine the exact temperature of operation and amount of movement of the valve seat.

Therefore, there exists a need for a valve assembly having a gate or disc that compensates for misalignment with a valve seat when rotated into contact therewith. There exists a further need for a diverter valve having a gate or disc that rotates between two valve seats and that compensates for misalignments between the valve seats and the gate.

SUMMARY OF THE INVENTION

The present invention generally relates to methods and apparatus for selectively blocking or redirecting flow with a valve that compensates for misalignment between a seat and a gate. In one aspect, a valve includes a gate having two discs spaced from one another, first and second seats within first and second passageways of the valve, respectively, and at least one lever arm coupled to an actuator for rotating the gate, thereby diverting flow. The lever arm is disposed between the discs and pivotally couples to the gate such that the pivoting movement of the gate enables compensation for the misalignment. A method includes rotating a gate from a first position with a plane of the gate axially aligned with flow to a second position with the disc initially contacting a seat and compensating for the misalignment by pivoting the gate with respect to the lever arm such that the gate squarely contacts the seat.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally relates to a valve assembly for selectively blocking or redirecting a flow of fluids such as gases and liquids, solids and mixtures thereof through the use of a gate that compensates for misalignment with a valve seat when the gate rotates to contact the valve seat. The gate may include one or more discs having a circular outer diameter or any other shape that is capable of seating against the valve seat. Preferably, contact between the disc and the valve seat forms a seal to substantially prevent fluid flow between the disc and the valve seat. Since the valve assembly may be used in any application, the valve assembly is not limited to any particular range of temperatures, pressures, angles of diversion or diameters.

Figure 1:
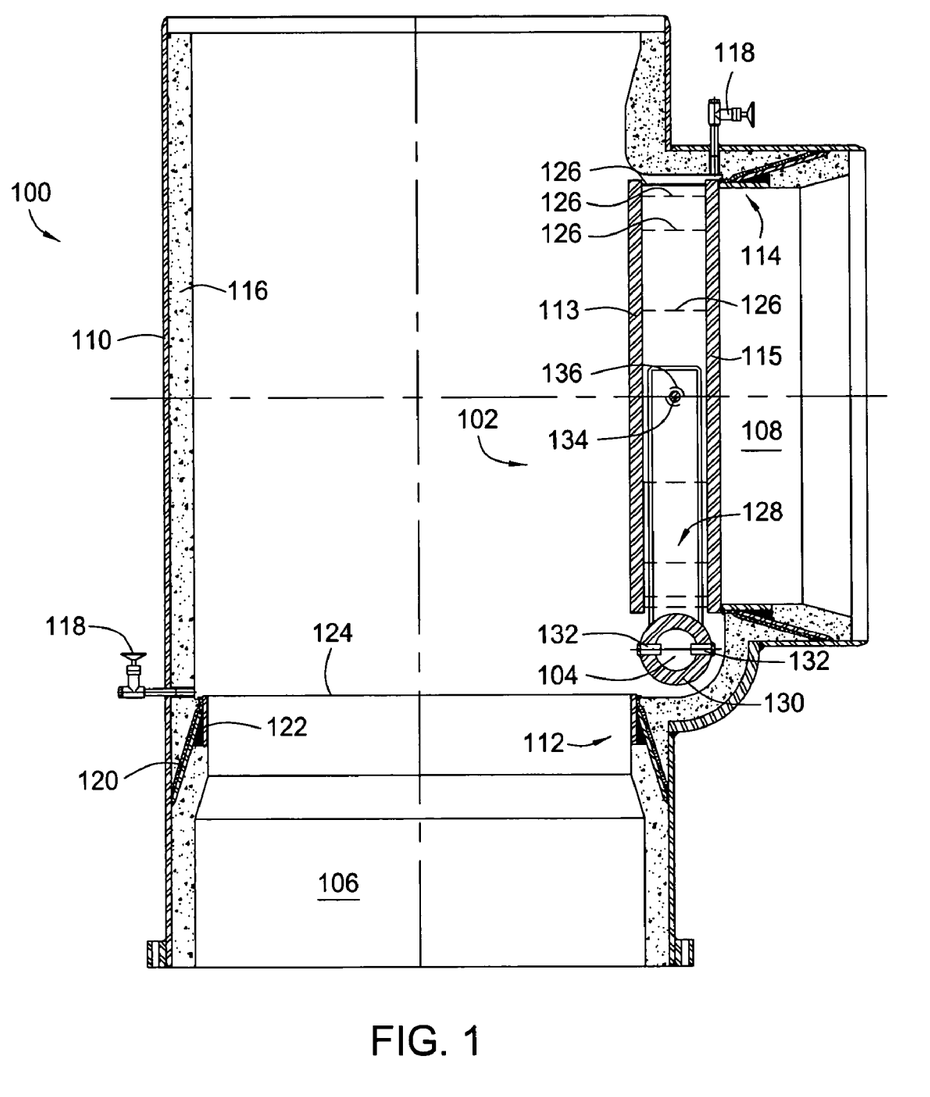
FIG. 1 is a section view of a diverter valve having a disc and lever arm assembly that rotates to selectively divert flow between two different passageways.

FIG. 1 illustrates a diverter valve 100 having a disc and lever arm assembly 102 that rotates about the center of an axle or shaft 104 to selectively divert flow between a first passageway 106 and a second passageway 108 that are defined by an outer housing 110 of the valve 100. The interior of the housing 110 includes a first seat 112 within the first passageway 106 and a second seat 114 within the second passageway 108. The first and second seats 112, 114 each have a surface for respective contact with a first and a second disc 113, 115 of the lever arm assembly 102. In a first position of the disc and lever arm assembly 102 shown in FIG. 1, the second disc 115 contacts the second seat 114 to block flow through the second passageway 108 and permit flow through the first passageway 106. As shown, the plane of the disc and lever arm assembly 102 is substantially axially aligned with a flow of fluid through the first passageway 106.

Figure 2:
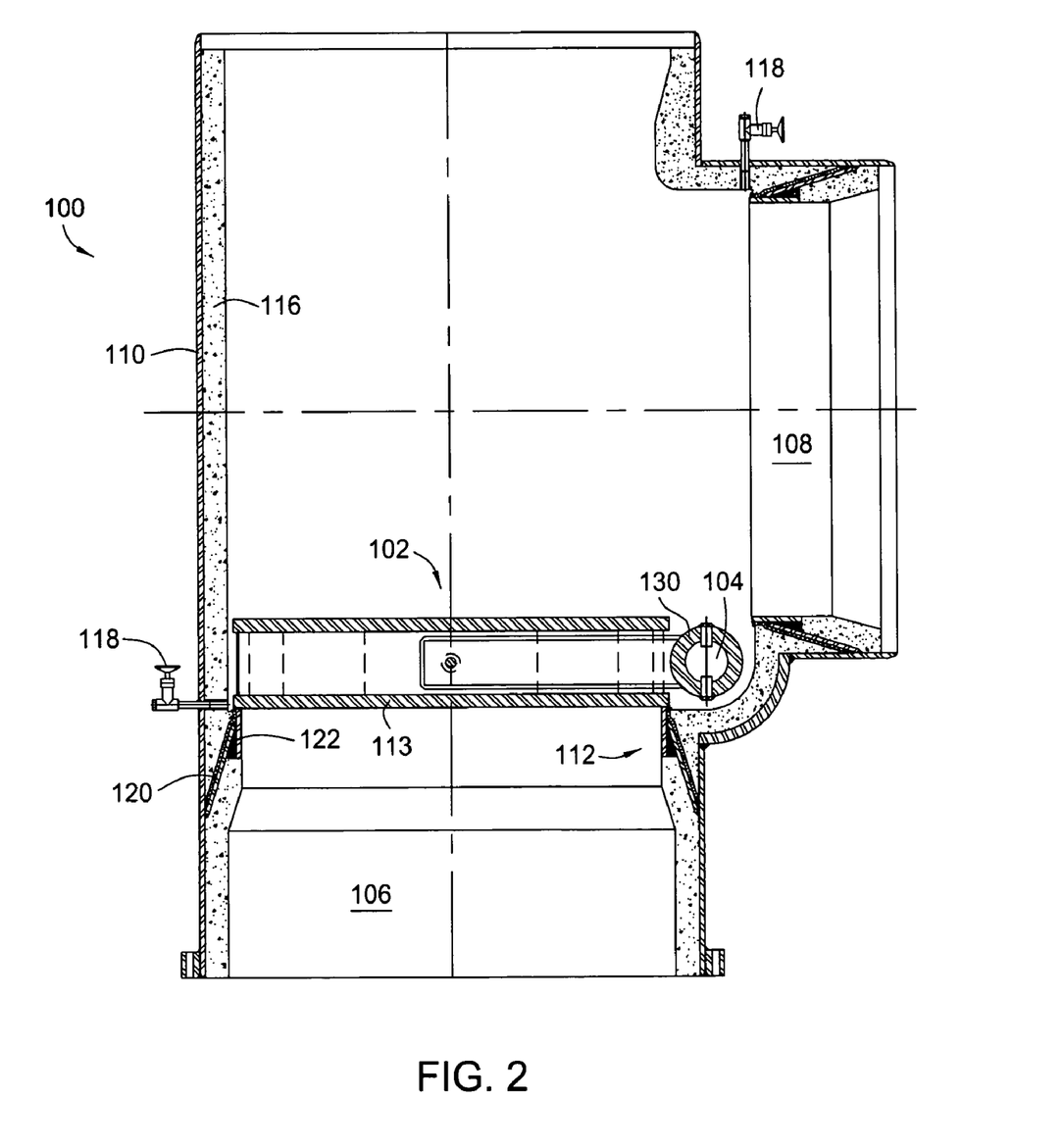
FIG. 2 is a section view of the diverter valve shown in FIG. 1 with fluid flow diverted to the other passageway.

In operation, the disc and lever arm assembly 102 rotates about the center of the shaft 104 to move the disc and lever arm assembly 102 from the first position to a diverted or second position as illustrated in FIG. 2. The first disc 113 contacts the first seat 112 to block flow through the first passageway 106 and permit flow through the second passageway 108 when the disc and lever arm assembly 102 is in the second position. Thus, rotation of the disc and lever arm assembly 102 diverts flow through either the first or second passageway 106, 108 depending on whether the disc and lever arm assembly 102 is in the first position or the second position. Moving the disc and lever arm assembly 102 between the first and second position rotates the plane of the discs 113, 115 about an axis at the center of the shaft 104, which is located adjacent the discs 113, 115.

Referring back to FIG. 1, the housing 110 of the valve 100 may be made of any suitable material based upon the application such as carbon steel or stainless steel. Preferably, the housing 110 is made of carbon steel if the valve is used in high temperature (e.g., about 1400° F.) applications in order to avoid cracking. Furthermore, an optional refractory lining 116 on the inside surface of the housing 110 may be added to provide insulation and resistance to abrasion. The valve 100 may additionally include one or more seat purges 118 spaced around the perimeter of the first and second seats 112, 114 to supply a pressurized cleaning fluid to the seats 112, 114 to clean any debris that may be present on the seats prior to the discs 113, 115 rotating into contact with their respective seat. The seat purges 118 can be individual nozzles or a single ring following the circumference/perimeter of each seat 112, 114 that may be separate from or integral to the seats 112, 114.

The first seat 112, which is structurally analogous to the second seat 114, includes a cone shaped member 120 affixed to the inside of the housing 110 such as by a weld. Orientation of the cone shaped member 120 faces an apex of the cone shaped member toward the flow through the first seat 112. A tubular shaped ring 122 affixed to the smallest inside diameter of the cone shaped member 120 provides a seat surface 124 directed toward the first disc 113 when the disc and lever arm assembly 102 is in the second position. Any known connection such as a weld may affix the tubular shaped ring 122 to the cone shaped member 120. The seat surface 124 and an inside surface of the tubular shaped ring 122 may include a surface finish having a high resistance to abrasion and erosion such as but not limited to a Stellite #1 coating welded thereto. Similarly, a peripheral portion of the disc 113 that contacts the seat surface 124 may include a surface finish having a high resistance to abrasion and erosion such as but not limited to a Stellite #1 coating welded thereto and finished by machining or grinding. The surface finishes on the seats 112, 114 and/or discs 113, 115 help ensure proper sealing when in contact with each other. While the seats 112, 114 are shown having the cone shaped member 120 and the tubular shaped ring 122, the actual design or structure of the seats 112, 114 of the valve 100 can include any arrangement that provides the seat surface 124. For example, a top surface of a singular stainless steel tubular ring welded, bolted or clamped directly to the inside surface of the housing 110 can provide the seat surface 124.

In a particularly advantageous aspect, the design and operation of the disc and lever arm assembly 102 enables the discs 113, 115 to compensate for misalignments and provide mating contact with the valve seats 112, 114 regardless of the precise location of the valve seats 112, 114 with respect to the disc and lever arm assembly 102. The disc and lever arm assembly 102 includes the discs 113, 115 separated by a plurality of parallel ribs 126 attached thereto, a plurality of parallel support arms 128 interleaved among the parallel ribs 126, and a hollow cylindrical hub 130 that one end of the support arms 128 secure to. The ribs 126 may be welded to the backside of the discs 113, 115 and run substantially the entire length between the discs 113, 115 in order to provide support for the discs 113, 115. Furthermore, the ribs 126 are plates arranged perpendicular to the discs 113, 115 and have a height sufficient to separate the discs 113, 115 by a distance greater than the height of the support arms 128. A long cylindrical pin 134 extends across a centerline of the discs 113, 115 through apertures 136 passing transversely through both the ribs 126 and the support arms 128. Thus, the support arms 128 only need to extend from the hub 130 far enough to allow for locating the apertures 136 at the centerline. The discs 113, 115 can pivot about the pin 134 without interfering contact by the support arms 128 since the discs 113, 115 are not attached directly to any of the support arms 128 and are separated by the distance greater than the height of the support arms 128 that is sufficient to permit the pivotal movement of the discs 113, 115 through the full temperature range desired. The pin 134 couples the support arms 128 that are secured to the hub 130 to the ribs 126 that are attached to the discs 113, 115 such that rotation of the hub 130 rotates the entire disc and lever arm assembly 102 including the discs 113, 115.

In operation, an actuator 300 (shown in FIG. 3) turns the shaft 104, which provides rotation of the disc and lever arm assembly 102 since the hub 130 is mounted to the shaft 104. A portion of the shaft 104 extends into an interior of the hub 130 to mount the hub 130 on the shaft 104. Two keys 132 insert into apertures in the hub 130 and corresponding recesses in the shaft 104 to prevent relative rotation between the hub 130 and the shaft 104. The keys 132 may be held in place by a weld. Thus, the actuator 300 for the valve 100 turns the shaft 104 approximately 90° back and forth in order to move the disc and lever arm assembly 102 between the first and second positions.

The rotation of the disc and lever arm assembly 102 forces one of the discs 113, 115 into contact with a respective one of the valve seats 112, 114 depending on whether the disc and lever arm assembly 102 is in the first or second position. The ability of the discs 113, 115 to pivot about the pin 134 enables the discs 113, 115 to compensate for misalignments by permitting the discs 113, 115 to squarely contact the valve seats 112, 114 regardless of the precise location of the valve seats 112, 114 with respect to the disc and lever arm assembly 102. For example, the first valve seat 112 may be aligned too far forward such that the disc and lever arm assembly 102 does not complete the entire 90° rotation prior to the first disc initially contacting the first valve seat 112. However, the disc and lever arm assembly 102 still forces the first disc 113, which pivots about the pin 134 to compensate for the premature contact, into mating contact with the first valve seat 112. On the other hand, the first disc 113 may pivot about pin 134 in the opposite direction if the first valve seat 112 is aligned too far back from the disc and lever arm assembly 102 such that the disc and lever arm assembly 102 rotates more than 90° to force the first disc 113 into mating contact with the first valve seat 112.

Figure 3:
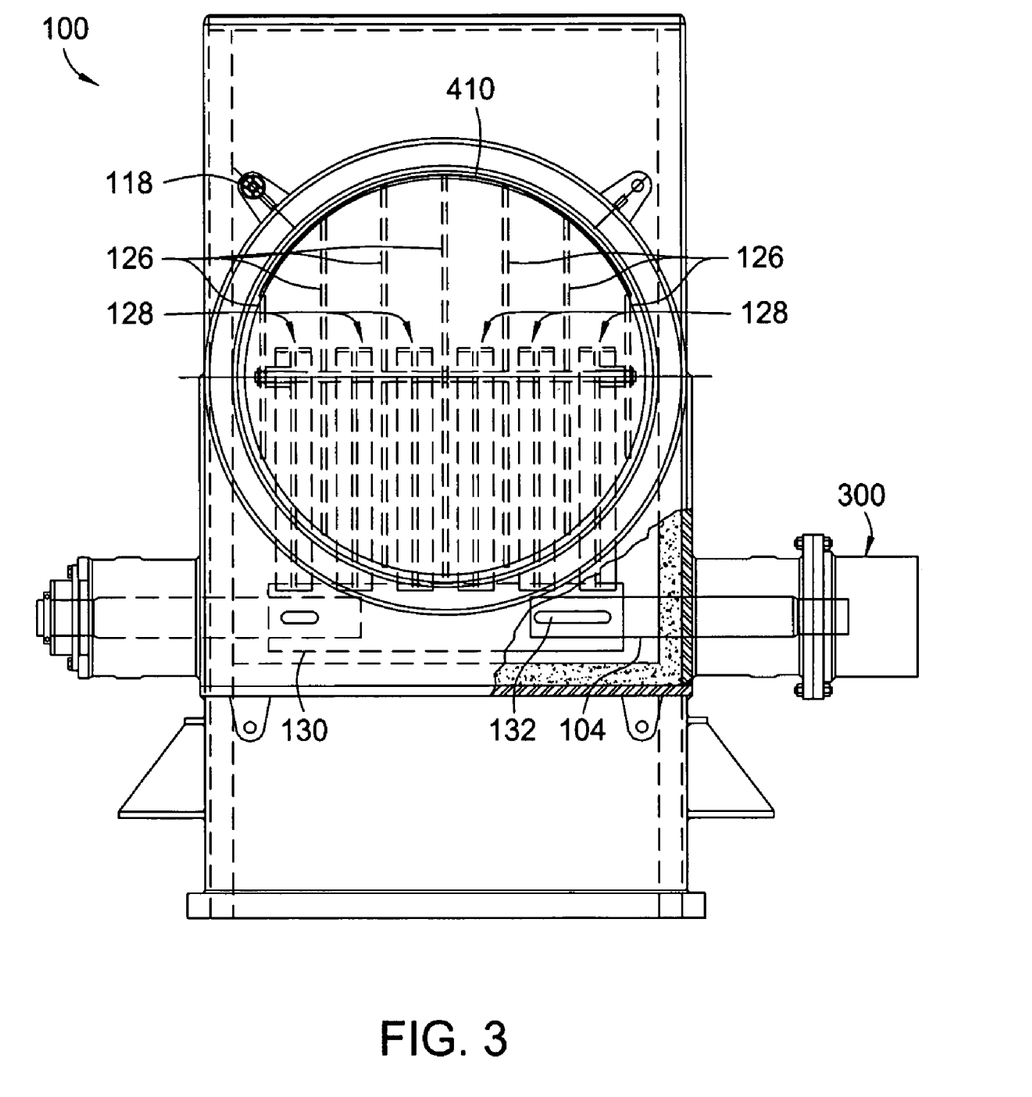
FIG. 3 is a side view of the diverter valve shown in FIG. 1.
Figure 4:
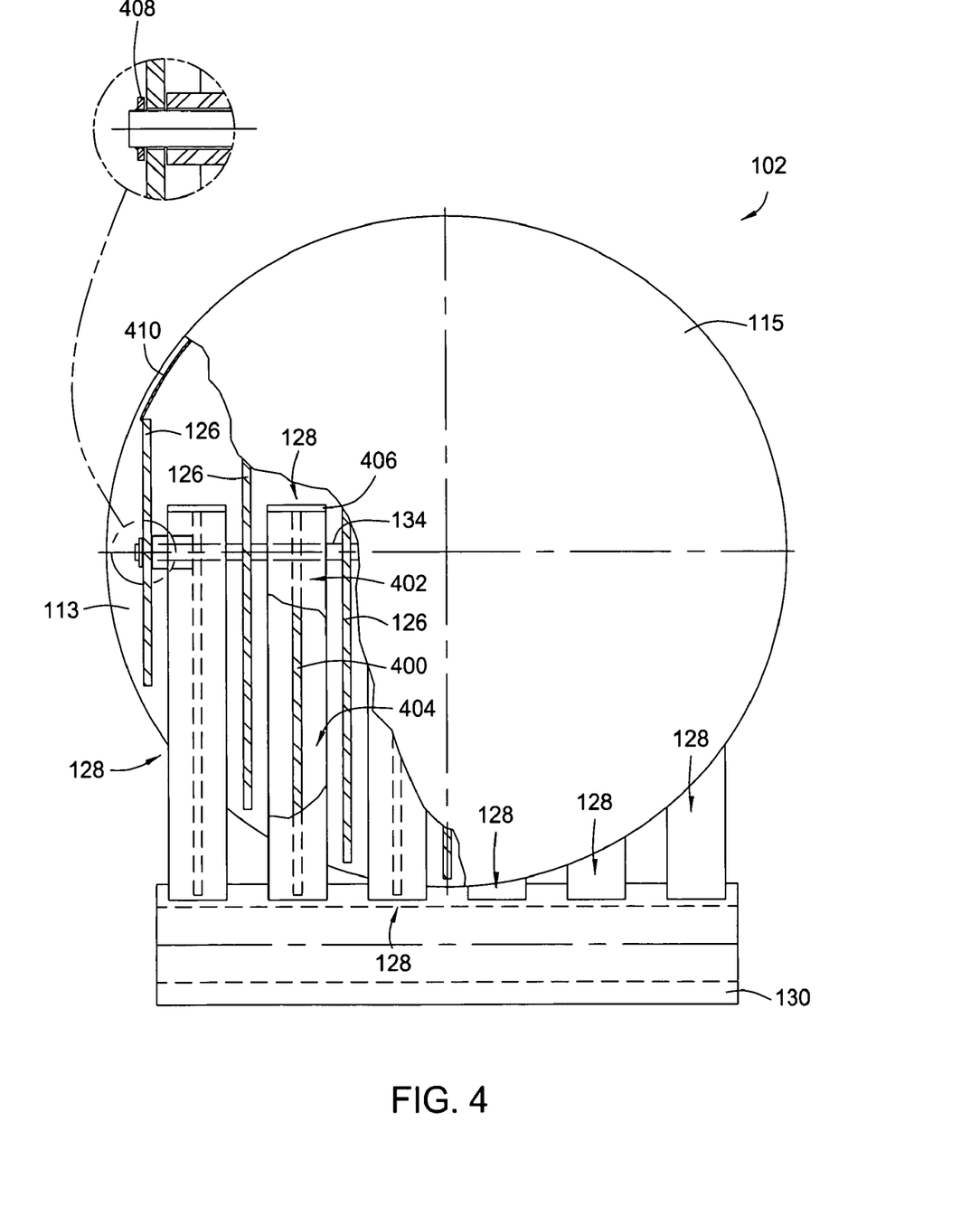
FIG. 4 is a top view of the disc and lever arm assembly of the diverter valve shown in FIG. 1.

FIG. 3 illustrates a side view of the valve 100 with hidden elements such as the support arms 128 and the ribs 126 shown in dashed lines to reveal their arrangement within the valve 100. FIG. 4 shows a top view of the disc and lever arm assembly 102 with details having cut away portions of the second disc 115 and one of the support arms 128.

Referring to FIG. 4, each of the support members 128 include a vertical member 400 disposed between an upper plate 402 and a lower plate 404 to form an I-beam having an end plate 406. One end of the upper and lower plates 402, 404 and vertical member 400 of each support members 128 may be welded to the hub 130. The apertures 136 that permit passage of the pin 134 extend through an opposite end of the vertical members 400. On each end of the pin 134 adjacent the outside face of the outside rib 126, a washer 408 having a diameter greater than the apertures 136 is welded to the pin 134 to prevent the pin 134 from sliding axially through the apertures 136 in the support arms 128 and ribs 126. Also visible in FIG. 4 is a top shield 410 that substantially prevents flow through the area between the discs 113, 115 as the disc and lever arm assembly 102 moves from the first position to the second position. The top shield 410 is a curved plate perpendicular to the discs 113, 115 that has a height equivalent to the height of the ribs 126 and extends across a top edge of the discs between at least the two outside ribs 126 to block flow between the ribs disposed inside of the two outside ribs.

Figure 5:
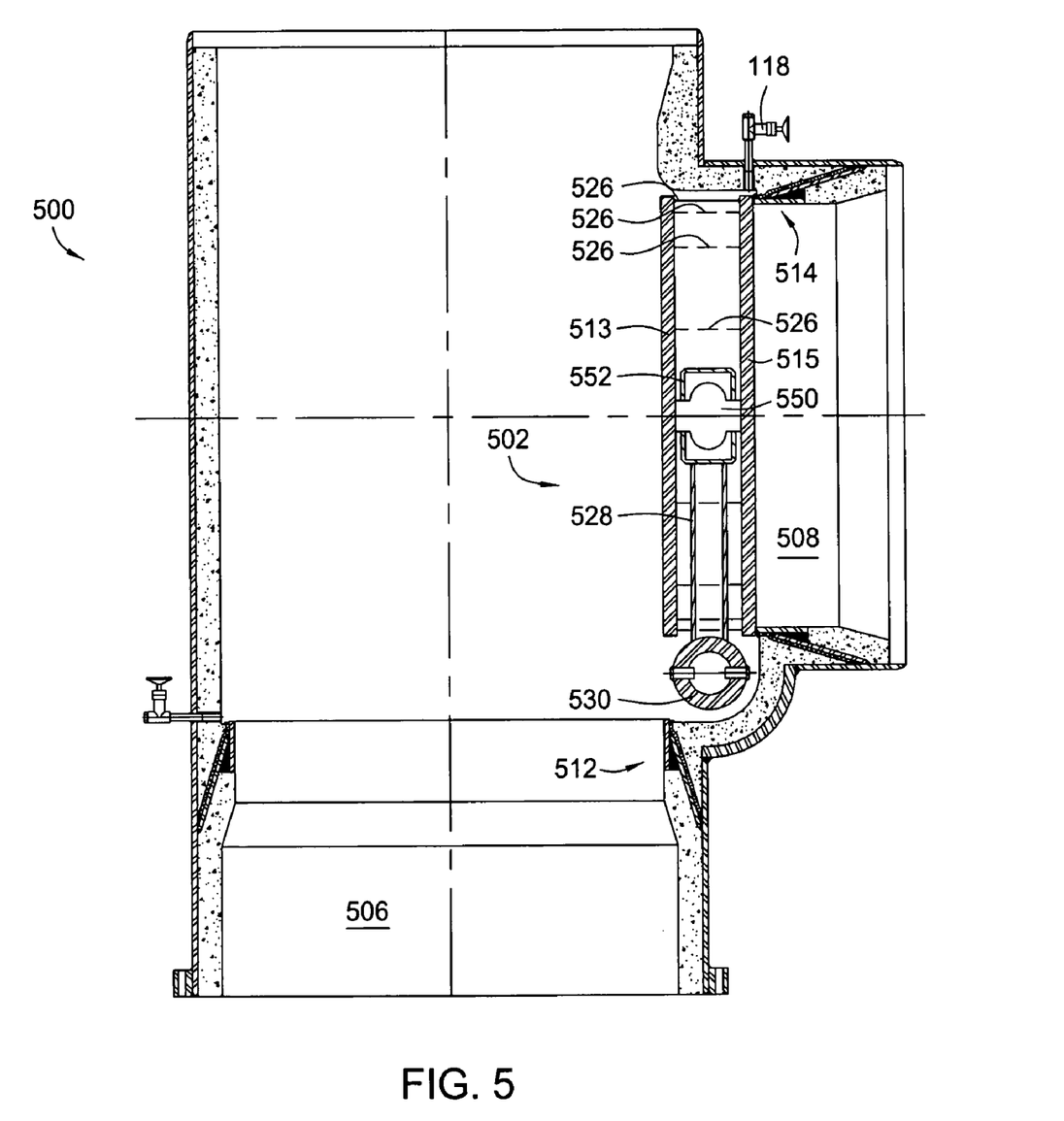
FIG. 5 is a section view of an alternative embodiment of a diverter valve having a disc and lever arm assembly that includes a ball-in-socket arrangement.

FIG. 5 is a section view of an alternative embodiment of a diverter valve 500 having a disc and lever arm assembly 502 that includes a ball-in-socket arrangement. The disc and lever arm assembly 502 moves between a first position and a second position in order to divert flow between a first passageway 506 and a second passageway 508 as described above with reference to the valve shown in FIGS. 1–4. However, the disc and lever arm assembly 502 of the valve 500 includes discs 513, 515 separated by a plurality of parallel ribs 526 attached thereto, a single central support arm 528 positioned between two centermost ribs 526, and a hollow cylindrical hub 530 that the support arm 528 secures to. The support arm 528 extends from the hub 530 to a center of the discs 513, 515 where a central post 550 having an enlarged ball shaped middle section is secured to the discs 513, 515. Each end of the central post 550 attaches to the back side of one of the discs 513, 515. A socket assembly 552 of the support arm 528 surrounds the ball shaped middle section of the central post 550. Due to the ball-in-socket arrangement between the support arm 528 and the central post 550 attached to the discs 513, 515, the discs 513, 515 can pivot about 360° without interfering contact by the support arm 528 since the ribs 526 separate the discs 513, 515 by a sufficient distance greater than the height of the support arms 128. Similar to the discs capable of pivoting in one direction as described above, the ability of the discs 513, 515 to pivot about 360° enables the discs 513, 515 to compensate for misalignment with valve seats 512, 514 as the discs are forced into contact with the valve seats 512, 514.

Figure 6:
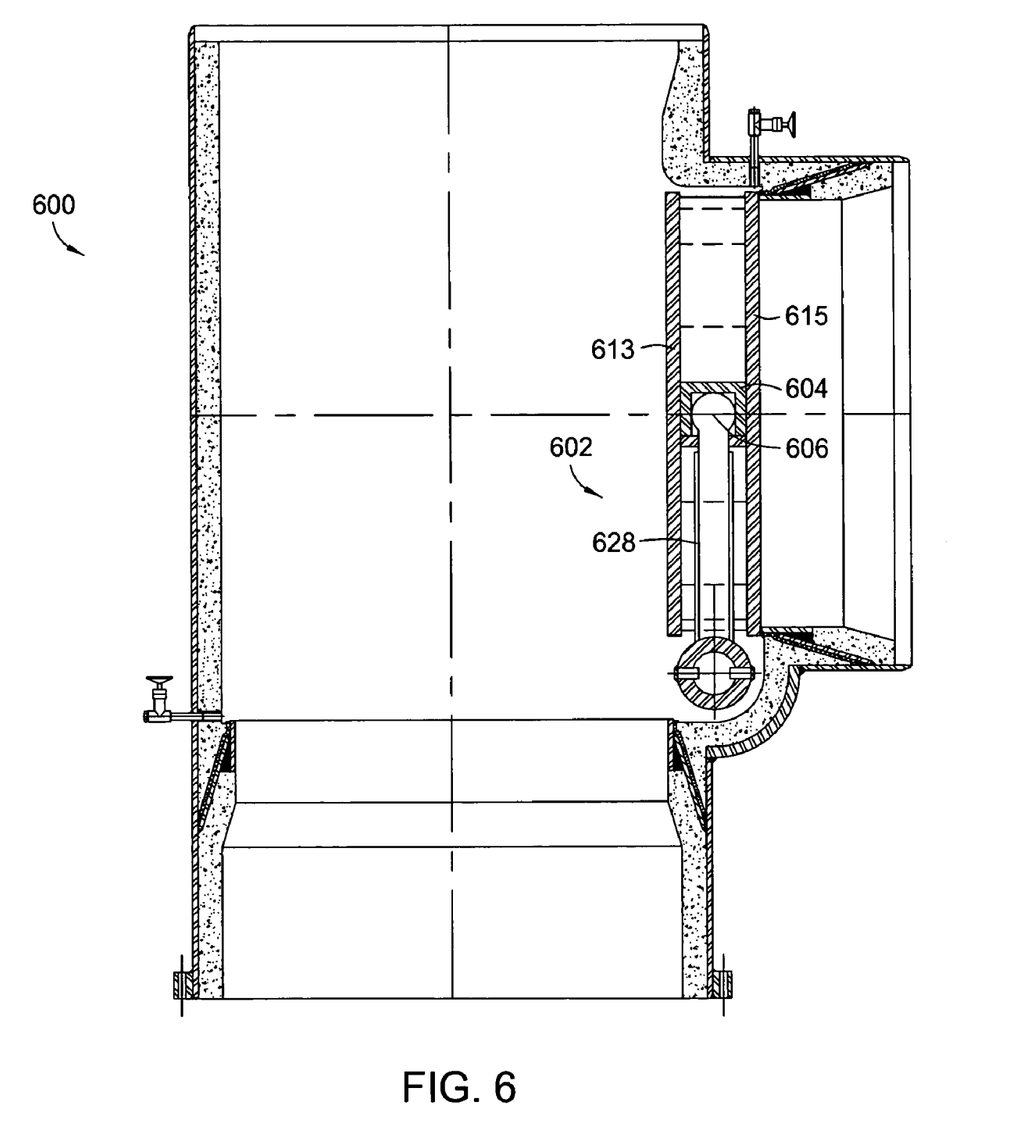
FIG. 6 is a section view of an alternative embodiment of a diverter valve having a disc and lever arm assembly that includes a ball-in-socket arrangement.

FIG. 6 is a section view of an alternative embodiment of a diverter valve 600 having a disc and lever arm assembly 602 that includes a ball-in-socket arrangement that is reversed from the ball-in-socket arrangement shown in FIG. 5. Specifically, a support arm 628 has a ball shaped end 606 that mates with a socket portion 604 centrally secured to the discs 613, 615. The diverter valve 600 operates as described herein to enable the discs 613, 615 to move or adjust in order to close flow paths through the valve 600.

The disc and lever arm assemblies described herein may be used with open/close valves that do not divert flow to another passageway but rather simply open and close flow to a single fluid passageway through the valve such as the first fluid passageway 106 shown in FIG. 1. As such, the open/close valve does not include a second passageway or a second valve seat and the second disc may be omitted or replaced with any member capable of providing structural support to the disc and lever arm assembly. For example, a ball may be attached to a single disc that is engaged by a socket on a lever arm for applications similar to FIG. 5 except utilizing a single disc.

Examples of industries that can benefit from valves as described herein include water utilities, power plants, refineries and chemical manufacturing. In one example of an application using the invention, a valve according to embodiments described above can be part of a fluid catalyst cracker unit and can be used to isolate one line therein (e.g., the second passageway 134) for a desired purpose such as an emergency situation or to construct/repair the line. As another example, a valve according to embodiments described above can control flow from an ethylene unit during the production of plastics.

While the foregoing is directed to embodiments of the present invention, other and further embodiments of the invention may be devised without departing from the basic scope thereof, and the scope thereof is determined by the claims that follow.

What is claimed is:

1. A diverter valve assembly, comprising:
a housing defining a body of the valve assembly;
a first valve seat within a first passageway of the body;
a second valve seat within a second passageway of the body;
a gate having first and second discs spaced from one another, wherein the first disc is separated from the second disc by a plurality of parallel ribs that are each attached to a backside of each disc and extend substantially across an entire length of the disks between opposite edges of the disks; and
at least one lever arm disposed between the discs and pivotally coupled to the gate at one end of the lever arm, wherein an opposite end of the lever arm is coupled to an actuating member adjacent the gate for rotating the gate between a first position with the first disc in contact with the first valve seat and a second position with the second disc in contact with the second valve seat.

2. The valve assembly of claim 1, wherein the second passageway is diverted substantially 90° relative to the first passageway.

3. The valve assembly of claim 1, wherein the at least one lever arm includes a plurality of parallel lever arms interleaved among the plurality of parallel ribs.

4. The valve assembly of claim 3, wherein the lever arms are pivotally coupled to the gate by a pin extending across a centerline of the discs through apertures passing transversely through both the ribs and the lever arms.

5. The valve assembly of claim 1, wherein the at least one lever arm includes a single central support arm pivotally coupled to the gate by a socket at one end of the support arm that engages a ball portion of a central post connected to both discs.

6. The valve assembly of claim 1, wherein the at least one lever arm includes a single central support arm pivotally coupled to the gate by a ball at one end of the support arm that engages a socket portion centrally connected to both discs.

7. The valve assembly of claim 1, further comprising one or more seat purges disposed around the perimeter of the valve seats.

8. The valve assembly of claim 1, further comprising a refractory lining on an inside surface of the housing.

9. The valve assembly of claim 1, wherein the valve seats include a cone member having an apex and a valve seat surface, which are directed toward the flow through the passageways.

10. A method of compensating for a misalignment between a valve seat and a corresponding gate used with an ethylene unit, comprising:

providing a valve having the gate on a lever arm and the valve seat within a passageway of the valve;

controlling flow from the ethylene unit during production of plastics by rotating the lever arm about an axis adjacent the gate from a first position with a plane of the gate axially aligned with flow through the passageway to a second position with the plane of the gate rotated and the gate initially contacting the valve seat; and pivoting the gate with respect to the lever arm such that the gate squarely contacts the valve seat to compensate for the misalignment.

11. The method of claim 10, wherein a fluid tight seal is formed between the gate and the valve seat once the gate squarely contacts the valve seat.

12. The method of claim 10, wherein the lever arm includes a plurality of support arms pivotally coupled to the gate by a pin extending across a centerline of the gate through apertures passing transversely through both the support arms and ribs attached to the gate.

13. The method of claim 10, wherein the lever arm includes a single central support arm pivotally coupled to the gate by a ball-in-socket engagement therebetween.

\* \* \* \* \*